(12) United States Patent
Gao et al.

(10) Patent No.: US 7,953,590 B2
(45) Date of Patent: May 31, 2011

(54) USING SEPARATE RECORDING CHANNELS FOR SPEECH-TO-SPEECH TRANSLATION SYSTEMS

(75) Inventors: Yuqing Gao, Mount Kisco, NY (US); Liang Gu, Yorktown Heights, NY (US); Wei Zhang, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 906 days.

(21) Appl. No.: 11/865,877

(22) Filed: Oct. 2, 2007

(65) Prior Publication Data

US 2009/0306957 A1 Dec. 10, 2009

(51) Int. Cl.
*G06F 17/28* (2006.01)
*G10L 15/00* (2006.01)
*G10L 13/00* (2006.01)

(52) U.S. Cl. ............................. 704/2; 704/231; 704/258

(58) Field of Classification Search ................ 704/1–10, 704/231, 258
See application file for complete search history.

(56) References Cited

U.S. PATENT DOCUMENTS

| | | | | |
|---|---|---|---|---|
| 4,933,973 A * | 6/1990 | Porter | ............................ | 704/233 |
| 6,266,642 B1 * | 7/2001 | Franz et al. | .................... | 704/277 |
| 6,292,769 B1 * | 9/2001 | Flanagan et al. | ................... | 704/3 |
| 2003/0115059 A1 * | 6/2003 | Jayaratne | ....................... | 704/235 |
| 2003/0115068 A1 * | 6/2003 | Boesen | ......................... | 704/277 |
| 2005/0137854 A1 * | 6/2005 | Cancedda et al. | ................. | 704/9 |
| 2008/0126077 A1 * | 5/2008 | Thorn | ............................... | 704/8 |

* cited by examiner

*Primary Examiner* — David R Hudspeth
*Assistant Examiner* — Samuel G Neway
(74) *Attorney, Agent, or Firm* — Tutunjian & Bitetto, P.C.; Anne V. Dougherty

(57) ABSTRACT

A system and method for speech-to-speech translation using a translation system includes designating separate input channels for each of a plurality of speakers. In response to speech from a first channel in a first language, the speech from the first channel is translated to a second language, and in response to speech from the second channel in a second language, the speech from the second channel is translated to the first language. Translating the speech from the first channel and translating the speech from the second channel are performed concurrently.

20 Claims, 2 Drawing Sheets

USING SEPARATE RECORDING CHANNELS FOR SPEECH-TO-SPEECH TRANSLATION SYSTEMS

GOVERNMENT RIGHTS

This invention was made with Government support under Contract No. NBCH2030001 awarded by the Defense Advanced Research Projects Agency (DARPA). The Government has certain rights in this invention.

BACKGROUND

1. Technical Field

The present invention relates to translating speech from one language to another, and more particularly, to a system, apparatus and method for collecting multilingual speech through multiple recording channels and translating recorded speech accordingly during the use of a speech-to-speech translation system.

2. Description of the Related Art

Modern speech-to-speech (S2S) translation systems attempt to enable communications between two people that do not share the same language. To smooth the conversation between two speakers with different languages, current S2S translation systems have to handle two challenges. First, the system needs to know which language the user is currently speaking, based on either user feedback/selection or automatic language identification. Second, the system needs to either prevent two speakers from talking simultaneously or be able to focus on one of the speakers during a conversation.

In most state-of-the-art S2S translation systems, these two challenges are handled either ineffectively or in a user-unfriendly way. For the first challenge, to retrieve the language information, two buttons are commonly designed in a Graphical User Interface (GUI) to let the speakers control the recording of two languages respectively, which breaks the conversation into pieces and hence significantly reduces the information exchange speed and efficiency. Other S2S translation systems apply automatic language identification techniques, at the cost of inevitable identification errors and the resulting system malfunctions.

For the second challenge, an even bigger challenge occurs if the S2S translation system wants to focus on one of the speakers during a conversation when both users are talking. Moreover, it is a very difficult task to synchronize the conversation between two speakers without cross talking, especially when these two speakers do not share a common language.

SUMMARY

A need exists for a speech recording system and method that enables highly accurate language detection and speech recognition for a speech to speech (S2S) translation system even when two speakers are talking at the same time in a multilingual conversation.

A system and method for speech-to-speech translation using a translation system includes designating separate input channels for each of a plurality of speakers. In response to speech from a first channel in a first language, the speech from the first channel is translated to a second language, and in response to speech from the second channel in a second language, the speech from the second channel is translated to the first language. Translating the speech from the first channel and translating the speech from the second channel are performed concurrently.

The methods may be implemented using a computer readable medium comprising a computer readable program, wherein the computer readable program when executed on a computer causes the computer to perform the method.

A translation system includes a plurality of input channels where each input channel is configured to receive speech from a single speaker. A memory is configured to record speech from each channel to be translated and to store one or more training models and rules for translating the input speech. An automatic speech recognition engine and machine translator are configured to concurrently translate speech for each channel separately and independently from each of any other channel from an input language to another language.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
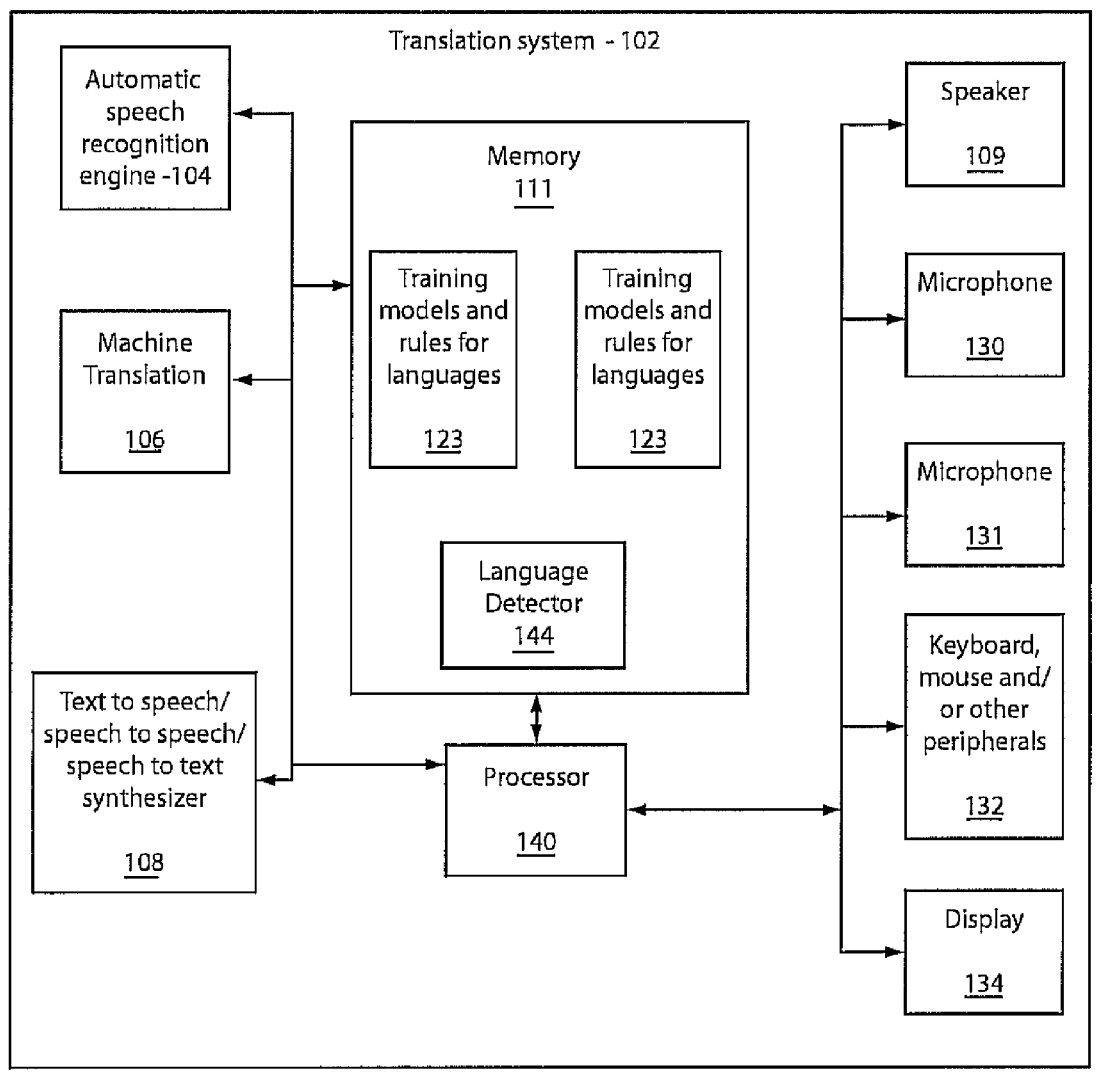
FIG. 1 is a block/flow diagram illustrating a system/method for an interactive user interface system that translates languages and permits user cross-talking by using separate speech recording channels in speech-to-speech translation, in accordance with one embodiment.

The shortcomings of the prior art are overcome and additional advantages are provided through the provision of a speech recording apparatus in speech-to-speech translation that separates speech-recording channels for various languages and enables automatic speech recognition even when two speakers are talking at the same time. In particular, a novel way of language identification and main speaker detection is provided using a designated recording channel for each speaker and constantly analyzing speech in a speech-to-speech translation system. For example, during a typical two-way conversation, two channels can start recording and recognition at the same time. Each channel is attached to one speaker and his/her language. When a valid speech signal is recorded and retrieved from one channel of one language, it is recognized, translated and synthesized into an utterance in another language and played back to the other speaker. Since the two channels are separated and each speaker stays with one channel, the corresponding language identification is both easy and highly accurate. Moreover, when two speakers talk into the channels at the same time, the speech of the main speaker can be picked out without any interference from the speech of the other speaker. The resulting S2S translation system hence allows cross talking during speech recognition without a noticeable degradation of speech recognition accuracy. It is also an important step towards high performance hands-free eyes-free S2S translation system.

In particularly useful embodiments, for an S2S translation application involving two users, two separated recording channels are setup and attached to the system, one for the native language and one for a foreign language, respectively. The native speaker is then provided the microphone corresponding to the channel of the native language, while the foreign speaker is provided the microphone corresponding to the channel of the foreign language. During speech-to-speech recognition, only the speech of the native language will be recorded through the "native language channel" and recognized/translated into a message in the other language. Similarly, only the speech of the foreign language will be recorded through the "foreign language channel" and recognized/translated into a message in the other language. Therefore, the two users can talk at the same time. In addition, the current signal-to-noise (SNR) ratio can be computed and updated based on the recorded audio signals from both channels and displayed on a graphical user interface (GUI). The SNR information can be further exploited to improve speech recognition accuracy.

We have achieved a solution for an apparatus and a method of using separate speech recording channels in speech-to-speech translation that enables multilingual users speaking at the same time and/or without stating the language they are using.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a block/flow diagram illustrates a system/method with an interactive user interface that provides multilingual user translations on separate channels for each speaker. A speech-to-speech recognition system 100 may include a dedicated translator or may be incorporated into a cellular telephone, a personal digital assistant or any other computer device. The system 100 may be employed for real-time multi-lingual speech translation between a plurality of speakers. System 100 includes a speech translation system 102 that collects the speech signal from one or more speakers and recognizes the speech in each source language using an automatic speech recognition (ASR) engine 104. A machine translation (MT) module 106 translates the recognized messages into the target language. System 100 synthesizes the speech sound of the translated sentence, and plays the speech by way of a speaker 109 using a text-to-speech synthesis (TTS) module 108. The TTS 108 may include the capability of text to speech, speech to speech and speech to text synthesis.

System 100 includes a memory 111 for recording input speech. Memory 111 also stores training models and rules 123 for one or more different languages or dialects. Multilingual user conversations are preferably recorded on separate channels. This may include identifying different speakers over a single channel using recognition technology, such as a language detector 144 or providing hardware such as separate microphones 130 and 131 to determine one speaker as opposed to another. A user or users can interact with system 102 by speaking into microphone 130 (or microphone 131), or employing other peripheral devices 132, such as a keypad/board, a mouse, a touch-sensitive screen, etc. Responses and outputs may be by way of speaker(s) 109, a display 134, and/or peripherals 132 (e.g., a printer, etc.). A processor 140 may include or work with an operating system for controlling the operations of system 102. Processor 140 (and/or operating system) is configured to decipher different speakers, different languages, different speaker locations, different noise levels or any other deciphering features helpful in setting up separate recording channels for each speaker. Language detector 144 may be implemented in software and interact with training models and rules to determine a speaker's language. Based upon a score generated for a plurality of language models, a determination of which language is being spoken into which microphone can be determined.

Speech-to-speech system 100 aims to facilitate communications between people speaking different languages. To achieve this goal, the speech translation system (1) collects the speech signal from at least one speaker through a designated recording channel, (2) recognizes the speech in the source language, (3) translates the recognized messages into the target language, (4) synthesizes the speech sound of the translated sentence, and (5) plays the sound by way of a speaker. (2), (3) and (4) are realized by automatic speech recognition (ASR) 104, machine translation (MT) 106 and text-to-speech synthesis (TTS) 108, respectively.

Two issues are addressed in accordance with the present principles. First, the system needs to determine which language should be the source language. If a single channel is used for both users, the speaker usually needs to indicate the language by triggering a pre-defined hot key or mouse button in a graphical user interface (GUI). Otherwise, the system needs to detect the language of each recorded utterance based on pre-trained statistical models. The former approach requires additional user attention/action and is typically not feasible for a hands-free eyes-free S2S translation system (which is preferable in accordance with the present principles) as the latter approach will involve language detection errors and introduce additional errors on the top of normal ASR, MT and TTS errors.

The second issue of speech recording for a S2S translation system is how to collect speech when two or more than two speakers speak at the same time. In this case, the speaker with the higher volume is usually viewed as the main speaker. As a result, the speech from other speaker(s) becomes the noise and may hence greatly deteriorate the speech recognition accuracy.

In accordance with the present principles, the recording scheme using separate channels solves both of these problems. As each recording channel represents a specific language, language detection/identification is now much easier and highly accurate. During speech-to-speech translation, the speech from one channel is collected and used for speech recognition and translation, while the signals from other channels are used for noise analysis that will improve rather than degrade speech recognition performance. Therefore, users may speak at the same time.

In one embodiment, a native speaker uses microphone 130 and a foreign speaker uses microphone 131. The native speaker speaks a first sentence into the microphone 130 in the native language. The language detector 144 detects that the first sentence is in the native language, and the system 102 can either identify the speaker or if each speaker has their own channel, then the channel (e.g., hardware) identifies the speaker. Since the system 102 determines that the first sentence input is in the native language, the first sentence is translated to the foreign language and output.

Now, the foreign speaker responds by speaking a second sentence into the microphone 131. The language detector 144 detects that the second sentence is in the foreign language, and the system 102 can either identify the speaker or if each speaker has their own channel, then the channel identifies the speaker. Since the system 102 determines that the second sentence input is in the foreign language, the second sentence is translated to the native language and output. The conversation between the two speakers in different languages can occur.

In addition, the speakers can speak simultaneously and the speaker 109 may include one or more speakers which can output translated sentences for corresponding channels or speakers. In other words, the translation system 102 can receive different language inputs, translate these inputs and output the results simultaneously.

Figure 2:
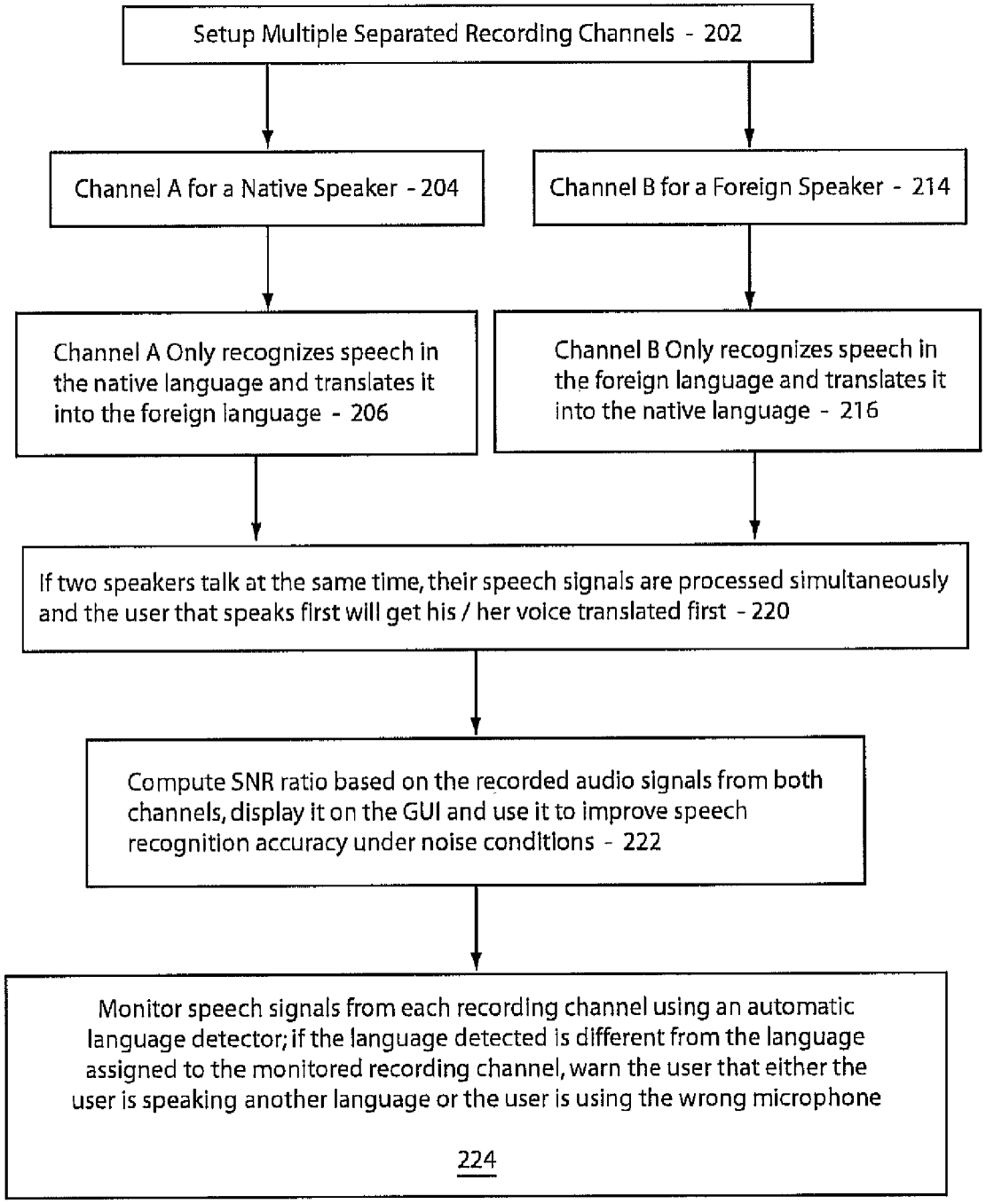
FIG. 2 is a block/flow diagram illustrating a system/method for an interactive user interface that provides easy language detection and allows user cross-talking by using separate speech recording channels in speech-to-speech translation, in accordance with another embodiment of the invention.

Referring to FIG. 2, a block/flow diagram illustratively shows a system/method for interacting with the system 100. One illustrative embodiment will be described in terms of a two speaker system; however the system may function with a number of speakers greater than two. In addition, the language described herein will be referred to as native and foreign for simplicity. It should be understood that any two or more languages may be recognized, translated and synthesized.

In block 202, for a S2S translation application involving two users, two separated recording channels are setup and attached to the system, one (channel A) for a native language in block 204 and one (channel B) for a foreign language in block 214, respectively. Channels A and B may be setup using different hardware, e.g., different microphones (130 and 132) or may employ the same hardware (e.g. microphone) and be deciphered using software to distinguish between speakers, languages, etc. In block 204, the native speaker may be provided the microphone corresponding to the channel of the native language, and in block 214, the foreign speaker may be provided the microphone corresponding to the channel of the foreign language. Both microphones may be labeled with a corresponding language identifier.

In block 206, during speech-to-speech recognition, only the speech of native language will be recorded through the "native language channel" and recognized/translated into the message of the other target language. Similarly, in block 216, only the speech of the foreign language will be recorded through the "foreign language channel" and recognized/translated into the message of the other (native) language.

In block 220, if two users talk at the same time, their speech is recorded separately through the two recording channels. The speech signals from both recording channels are recognized, translated and synthesized accordingly and independently. The two translated utterances are then played back to the users according to their original sequential order, namely, the user that speaks first will get their voice translated first.

In block 222, a current signal-to-noise (SNR) ratio can be computed and updated based on the recorded audio signals from both channels and displayed on the GUI. The SNR information can be further exploited to improve speech recognition accuracy. The SNR may be measured or assumed to be about the same for each channel to make it easier to filter out noise. In a system where the same microphone is employed for both speakers, the SNR may be employed as a feature to determine which speaker is speaking (noise may be greater based on a position of a speaker or other speaker-related factors.

In block 224, the speech signals from each recording channel maybe monitored constantly by an automatic language detector. If the language detected is different from the language assigned to the monitored recording channel, a warning message will be displayed on GUI and sent to the user, indicating the either the user is speaking another language or he/she is using the wrong microphone.

It should be understood that separate hardware and software may be assigned to each channel or both channels may share hardware/software depending on the platform being employed to provide the S2S translation system.

Having described preferred embodiments of a system and method for using separate recording channels for speech-to-speech translation systems (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for speech-to-speech translation using a translation system, comprising:
   designating separate input channels for each of a plurality of speakers;
   assigning an expected language to each of the input channels;
   in response to speech from a first channel in a first language, storing the speech from the first channel on a computer-readable storage medium and translating the speech from the first channel to a second language; and
   in response to speech from a second channel in a second language, translating the speech from the second channel to the first language;
   wherein the steps of translating the speech from the first channel and translating the speech from the second channel are performed concurrently; and
   monitoring each of the input channels to determine whether speech received by a articular input channel is in a language that matches the expected language assigned to the articular input channel.

2. The method as recited in claim 1, further comprising in response to speech from the first channel in the first language, outputting the speech from the first channel in the second language.

3. The method as recited in claim 2, further comprising in response to speech from the second channel in the second language, outputting the speech from the second channel in the first language.

4. The method as recited in claim 3, wherein the steps of outputting the speech from the first channel and outputting the speech from the second channel are performed concurrently.

5. The method as recited in claim 1, further comprising determining signal to noise ratio (SNR) for each channel.

6. The method as recited in claim 5, wherein the SNR for each channel is employed to improve speech recognition accuracy.

7. The method as recited in claim 1, wherein designating separate input channels for each speaker includes designating a separate microphone for each speaker.

8. The method as recited in claim 1, further comprising alerting a user that an unexpected language is being received by an input channel or that an incorrect channel is being employed if it is determined that speech received by an input channel is in a language which is not the expected language assigned to the input channel.

9. A non-transitory computer readable medium comprising a computer readable program, wherein the computer readable program when executed on a computer causes the computer to perform the steps of:
designating separate input channels for each of a plurality of speakers;
assigning an expected language to each of the input channels;
in response to speech from a first channel in a first language, translating the speech from the first channel to a second language; and
in response to speech from a second channel in a second language, translating the speech from the second channel to the first language;
wherein the steps of translating the speech from the first channel and translating the speech from the second channel are performed concurrently; and
monitoring each of the input channels to determine whether speech received by a particular input channel is in a language that matches the expected language assigned to the particular input channel.

10. The non-transitory computer readable medium as recited in claim 9, further comprising in response to speech from the first channel in the first language, outputting the speech from the first channel in the second language.

11. The non-transitory computer readable medium as recited in claim 10, further comprising in response to speech from the second channel in the second language, outputting the speech from the second channel in the first language.

12. The non-transitory computer readable medium as recited in claim 11, wherein the steps of outputting the speech from the first channel and outputting the speech from the second channel are performed concurrently.

13. A translation system, comprising:
a plurality of input channels where each input channel is assigned an expected language and is configured to receive speech from a single speaker;
a memory configured to record speech from each channel to be translated and to store one or more training models and rules for translating speech received from the input channels;
an automatic speech recognition engine and machine translator configured to concurrently translate speech for each channel separately and independently from each of any other channel from an input language to another language; and
a language detector configured to monitor each of the input channels to determine whether speech received by a particular input channel is in a language that matches the expected language assigned to the particular input channel.

14. The system as recited in claim 13, further comprising a synthesizer configured to output translated speech to a speaker.

15. The system as recited in claim 14, wherein the synthesizer is configured to output translated speech from a plurality of speakers concurrently.

16. The system as recited in claim 13, wherein the language detector is further configured to alert a user that an unexpected language is being spoken or that an incorrect channel is being employed if it is determined that speech received by an input channel is in a language other than the expected language assigned to the input channel.

17. The system as recited in claim 13, wherein the plurality of input channels each includes a separate microphone.

18. The system as recited in claim 13, further comprising a display and a graphical user interface configured for user interaction with the system.

19. The system as recited in claim 13, wherein speech recognition accuracy is improved by accounting for noise on each channel.

20. The system as recited in claim 13, wherein the machine translator begins to translate speech received from the plurality of input channels based on an order in which speech is received over the plurality of channels.

* * * * *